July 31, 1934.  O. KÖHLER  1,968,524
INTERNAL COMBUSTION ENGINE
Filed Dec. 31, 1930  4 Sheets-Sheet 1

Inventor
Otto Köhler
By: Marks & Clerk
Attys.

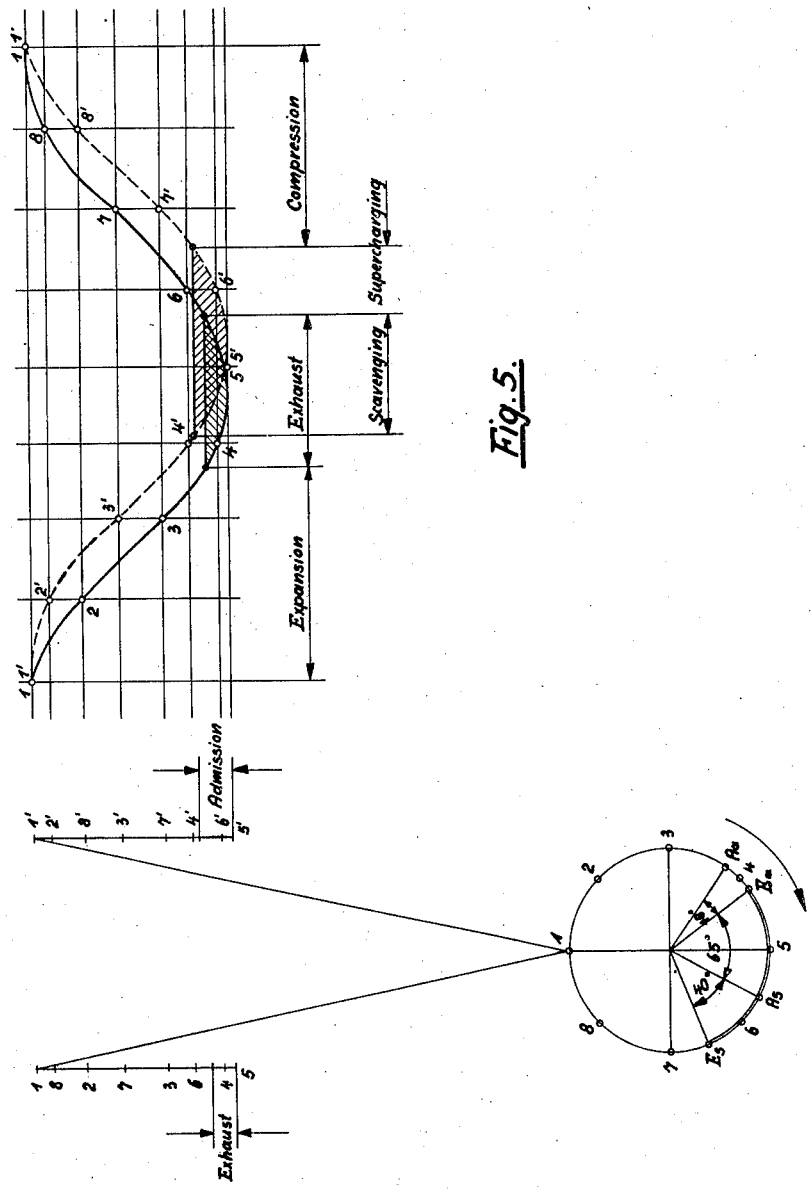

Patented July 31, 1934

1,968,524

UNITED STATES PATENT OFFICE 1,968,524

INTERNAL COMBUSTION ENGINE

Otto Köhler, Stuttgart-Unterturkheim, Germany, assignor to Daimler-Benz Aktiengesellschaft, Stuttgart-Unterturkheim, Germany, a company of Germany Application December 31, 1930, Serial No. 505,891
In Germany June 26, 1924

1 Claim. (Cl. 123—53)

This invention relates to a two-stroke internal combustion engine, the pistons of which have a common equidirectional motion and the cylinders of which are arranged in U-shaped formation, are connected by a common combustion chamber and have their piston-controlled admission ports closed later than the exhaust ports for the purpose of supercharging.

The invention consists in this that the charge is supplied to the cylinders by means of a blower which is independent of the cycle of operations of the pistons. For this purpose a rotary blower may be employed, which is used within the range of speeds, in which the delivery coefficient remains constant. A Roots blower is particularly suitable for this purpose.

In another way of carrying out the invention the blower may be connected to the crank casing of the engine, which also acts as a pump, so that the charge is conveyed into the two power cylinders under the joint action of the blower and the crank casing pump.

In the accompanying drawings two constructional examples of the invention are illustrated.

Fig. 5 shows a crank-angle diagram to a distance base for an engine in which the cylinders connected by a U-shaped combustion chamber are relatively far apart. The admission ports are higher than the exhaust ports.

Figure 1:
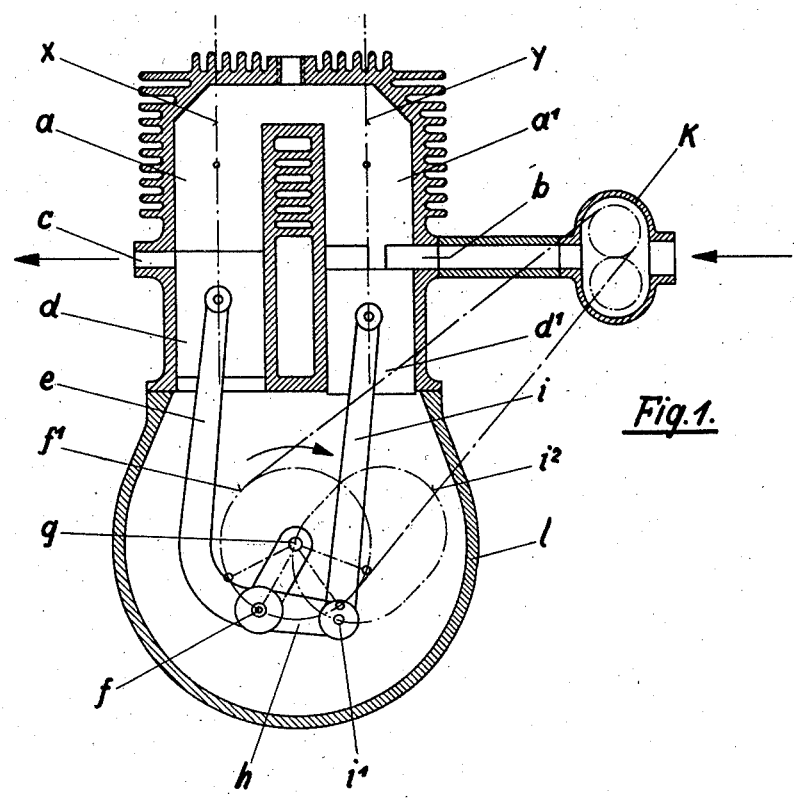
Fig. 1 shows the engine in section, the section being made through the centres of the cylinders perpendicular to the crank shaft.

According to Fig. 1 the two power cylinders $a$ and $a^1$ are provided with a common combustion chamber. The admission ports $b$ for the mixture are for instance in the cylinder $a^1$ and the exhaust ports $c$ in the cylinder $a$. The ports are controlled in a manner known per se by the pistons $d$ and $d^1$. The connecting rod $e$ of the piston $d$ is attached to the crank pin $f$. To an extension $h$ of the connecting rod $e$ the connecting rod $i$ of the piston $d^1$ is pivoted. The crank pin $f$ of the piston rod $e$ travels along a circular path $f^1$ and the pin $i^1$ of the connecting rod $i$ along an elliptical path $i^2$. The blower $k$ is connected by a pipe to the admission ports $b$. In the example shown in Fig. 2 the blower $k$ is connected to the crank casing $l$.

Engines with cylinders in U-shaped formation and having a common combustion chamber are usually provided with crank case scavenging and charging. Efficient scavenging and charging cannot be obtained in this way.

The invention entirely overcomes this disadvantage by scavenging and charging with a blower which is independent of the working of the cranks of the engines, preferably a Roots blower. The Roots blower has the peculiarity that in consequence of the return flow of the air between the unpacked pistons and the cylinder wall, the degree of delivery continuously varies within the range of low speeds of revolution and only becomes almost entirely constant within the range of high speeds of revolution, in which in accordance with the selected dimensions the quantity of the back-flowing air with respect to the air conveyed is so small as to be practically negligible. According to the invention the Roots blower is made such that it delivers the requisite charging quantity at a speed of revolution lying within the range of speeds of revolution within which the degree of delivery is constant. In place of the Roots blower a rotary blower having similar peculiarities may be used. The blower will be then of such small dimensions that it can be disposed at any part of the engine. Scavenging and charging is completely satisfactory as, through placing the cylinder axes at a suitable distance apart and through correctly selecting the height of the admission ports, the best possible intervals of time between the commencement of exhaust and admission or between the completion of the exhaust and admission may be obtained. Through the blower which operates independently of the working cycle of the engine the undesirable loss of fuel otherwise experienced in scavenging is prevented.

The following examples show in what way the most favourable conditions for scavenging and charging are obtained with an engine according to the present invention.

Figure 3:
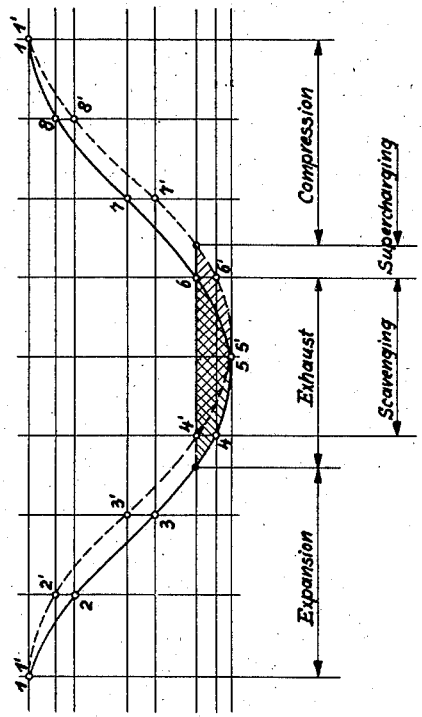
Fig. 3 shows a crank-angle diagram to a distance base for an engine in which the cylinders connected by a U-shaped combustion chamber are relatively close together. Admission and exhaust ports are the same height.
Figure 3:
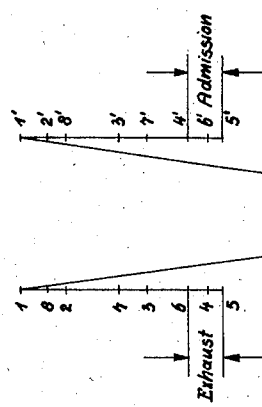
Figure 3:
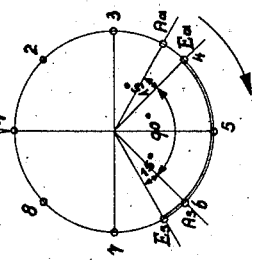

When the cylinders are for instance arranged close next to one another, scavenging will take place over a relatively small crank-angle. Fig. 3 shows such a diagram to a distance base. The admission and exhaust ports are assumed to be of equal height. It will be seen from the diagram that the exhaust port opens 15° before the admission port and also closes again 15° before the admission port (measured at the crank shaft), so that for supercharging there remains a crank angle of 15°. Scavenging takes place over a crank angle of 90°. A$a$ indicates the commencement of exhaust, E$a$ the commencement of admission, A$s$ the completion of the exhaust and E$s$ the completion of the admission.

Figure 4:
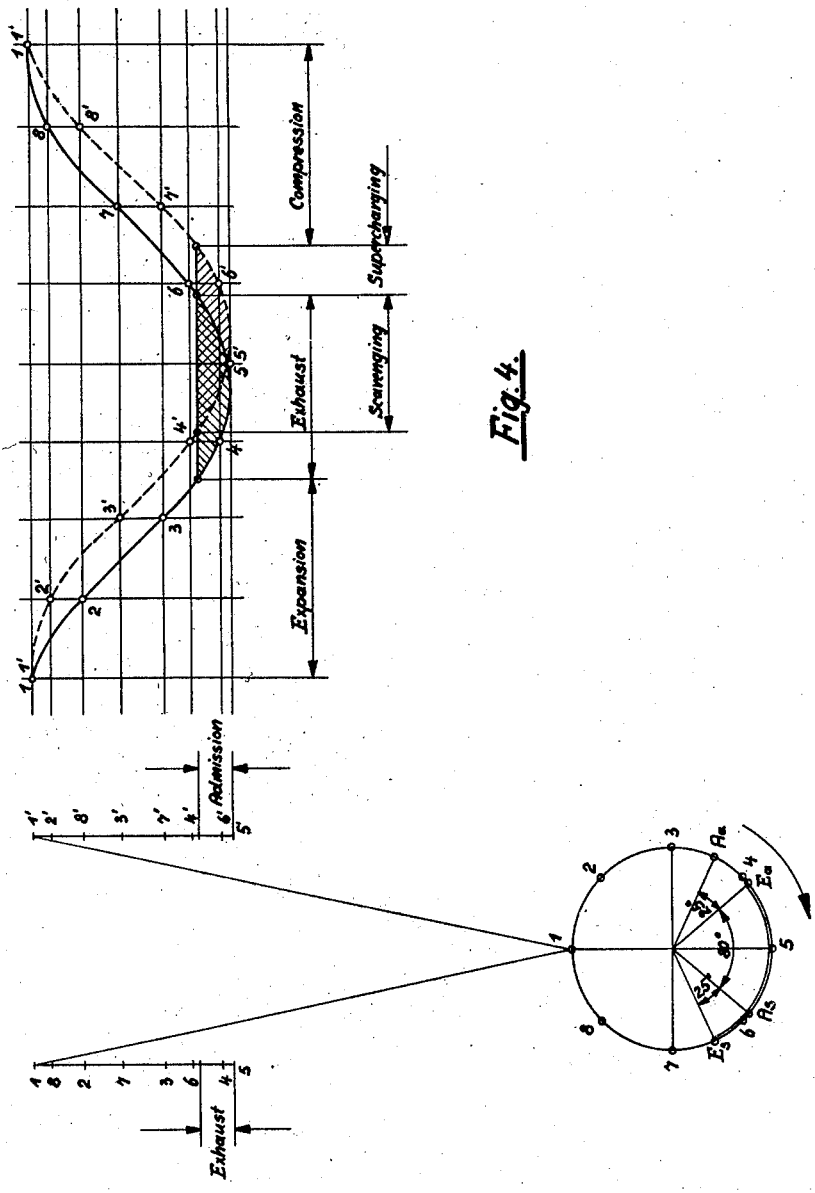
Fig. 4 shows a crank-angle diagram to a distance base for an engine in which the cylinders connected by a U-shaped combustion chamber are relatively far apart. Admission and exhaust ports are the same height.

Fig. 4 relates to an engine, the cylinders of which are placed further apart from one another. In this case the exhaust opens and closes 25° before the admission. Supercharging takes place over a crank angle of 25° and scavenging over a crank angle of 80°.

Fig. 5 relates to an engine in which the cylinders are at the same distance apart as in Fig. 4, the admission port being, however, higher than the exhaust port. With the assumed dimensions the exhaust will open 18° before the admission. Supercharging can take place over 40°, and scavenging over a crank angle of 65°. Thus while the piston controlling the exhaust is in advance between the extreme ends of the stroke, both pistons reach their extreme position simultaneously.

From the different constructional examples it will be seen that by the correct selection of the distance between the cylinders and of the height of the admission and exhaust ports, it is possible to obtain the best possible intervals of time between the commencement of the exhaust and admission or the completion of the exhaust and admission, the length of the link for connecting one of the connecting rods having no particular influence on the control.

In Fig. 1 the crank position is shown in which with an ascending piston the exhaust port $c$ is already covered while the admission port $b$ is still completely open.

On comparing the diagrams shown in Figs. 3, 4 and 5, it will be found that with a blower according to the invention in contradistinction to the crank casing pump, it is possible to effect a supercharging up to the admissible limit and consequently a considerable increase in the speed of revolution and power of the engine. This increase is only made possible by the combination of the system of two cylinders having a common combustion chamber with an independent blower, or an equivalent cylinder construction in which the required controlling conditions of the admission and exhaust members can be realized. The arrangement according to the invention results in an engine of extremely simple construction and of very high power, which enables the working cycle to be changed without valve control.

Figure 2:
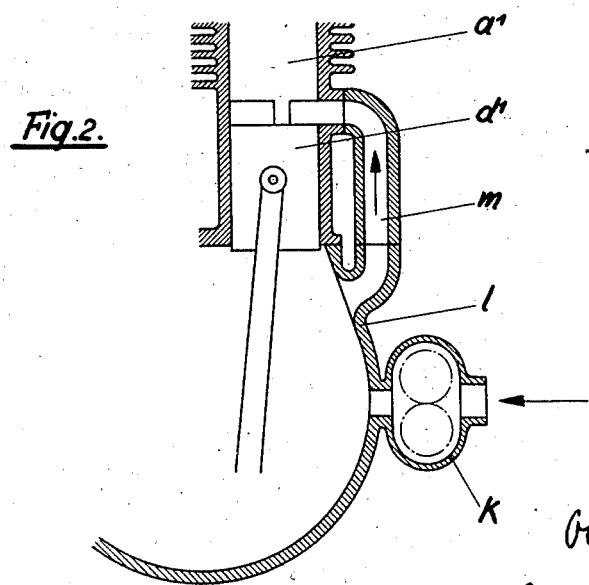
Fig. 2 is a section showing how the blower is mounted on the crank casing.

In the example shown in Fig. 2 the charge is introduced through the joint action of the two pressure producing members, namely the crank casing pump and the blower $k$ through the pipe $m$ into the power cylinder $a^1$. When the two-cylinder engine according to the above construction is scavenged and charged by a crank casing pump only, it is only possible, even when the most favourable conditions are selected, to obtain a limited power which hardly appreciably exceeds the power of two-stroke internal combustion engines of any other construction, as, owing to the ratios which are given within certain limits between the volume of the casing and the volume of the cylinders, only limited pressures are produced.

What I claim is:

A two-stroke internal combustion engine comprising in combination two cylinders disposed parallel to one another, a combustion chamber common to both cylinders and connecting the cylinders together to form a U-shaped structure, two pistons having a common equidirectional movement, one cylinder having inlet openings which are controlled by one piston at the lower dead centre while the other cylinder has outlet openings which are controlled by the other piston at the lower dead centre, a crank mechanism controlling the movement of the pistons whereby the inlet openings are closed later than the outlet openings, the said crank mechanism comprising a crank shaft, a crank pin on the crank shaft, a connecting rod pivoted to the said crank pin and to the piston controlling the outlet openings, an extension on the said connecting rod which extends radially from the said crank pin towards the side of the engine having the inlet openings, a second connecting rod pivoted to the said extension and to the piston controlling the inlet openings, and a rotary blower which delivers gas under pressure to the said inlet openings, and a driving connection between the crank mechanism and the blower for driving the latter from the crank shaft with a step-up in speed.

OTTO KÖHLER.